United States Patent

McMurtry et al.

[11] Patent Number: 5,339,535
[45] Date of Patent: Aug. 23, 1994

[54] TOUCH PROBE

[75] Inventors: David R. McMurtry, Wotton-under-Edge; David Wilson, Stonehouse; Peter K. Hellier, North Nibley; Peter Hajdukiewicz, Wotton-under-Edge, all of United Kingdom

[73] Assignee: Renishaw Metrology Limited, Gloucestershire, United Kingdom

[21] Appl. No.: 836,729

[22] Filed: Feb. 19, 1992

Related U.S. Application Data

[63] Continuation-in-part of Ser. No. 768,433, Sep. 26, 1991, abandoned.

[30] Foreign Application Priority Data

| Feb. 23, 1990 | [GB] | United Kingdom | 9004117.9 |
| Oct. 1, 1991  | [GB] | United Kingdom | 9120818.1 |
| Nov. 9, 1991  | [GB] | United Kingdom | 9123853.5 |

[51] Int. Cl.⁵ .................. G01B 5/03; G01B 5/20
[52] U.S. Cl. ......................................... 33/561; 33/558
[58] Field of Search ............... 33/556, 558, 557, 559, 33/560, 561

[56] References Cited

U.S. PATENT DOCUMENTS

| 4,084,323 | 4/1978  | McMurtry . |           |
| 4,153,998 | 5/1979  | McMurtry . |           |
| 4,177,568 | 12/1979 | Werner et al. . |      |
| 4,349,946 | 9/1982  | McMurtry . |           |
| 4,523,382 | 6/1985  | Werner et al. | 33/556 |
| 4,562,646 | 1/1986  | Dall'Aglio . |         |
| 4,581,826 | 4/1986  | Ernst       | 33/558   |
| 4,637,119 | 1/1987  | Schneider et al. . |   |
| 4,651,405 | 3/1987  | McMurtry . |           |
| 4,679,332 | 7/1987  | Luthi       | 33/559   |
| 4,688,307 | 8/1987  | Schneider . |          |
| 4,813,151 | 3/1989  | Hajdukiewicz et al. . | |
| 4,815,214 | 3/1989  | Enderle et al. | 33/558 |
| 4,817,362 | 4/1989  | Archer .    |          |
| 4,938,083 | 7/1990  | Gurny et al. . |       |
| 4,972,594 | 11/1990 | Gurny et al. | 33/561 |
| 5,024,003 | 6/1991  | Breyer .    |          |
| 5,041,806 | 8/1991  | Enderle et al. . |     |
| 5,048,194 | 9/1991  | McMurtry . |           |
| 5,084,981 | 2/1992  | McMurtry et al. . |    |

FOREIGN PATENT DOCUMENTS

| 0146697   | 7/1985  | European Pat. Off. . |
| 0392660   | 10/1990 | European Pat. Off. . |
| 0426492   | 5/1991  | European Pat. Off. . |
| 3811851   | 10/1989 | Fed. Rep. of Germany . |
| WO89/05210 | 6/1989 | PCT Int'l Appl. . |
| WO89/05435 | 6/1989 | PCT Int'l Appl. . |
| WO90/04149 | 4/1990 | PCT Int'l Appl. . |

*Primary Examiner*—Thomas B. Will
*Attorney, Agent, or Firm*—Oliff & Berridge

[57] ABSTRACT

A touch probe for use on a coordinate positioning machine includes a stylus module and a sensing module securable to a movable arm of the positioning machine for releasably supporting the stylus module. The sensing module can include a sensor for detecting contact between the stylus and a surface and/or for detecting displacement of the stylus module relative to the movable arm. The stylus includes a support structure, releasably supported by the stylus module, and a stylus-supporting member for supporting the stylus, with the stylus-supporting member being biased into a rest position with respect to the support structure. The stylus-supporting member is displaceable from the rest position and relative to the support structure when a deflection force acts on the stylus, and returns to the rest position when the deflecting force is removed.

13 Claims, 5 Drawing Sheets

TOUCH PROBE

RELATED APPLICATIONS

This is a continuation-in-part of U.S. patent application Ser. No. 07/768,433, filed on Sep. 26th, 1991, abandoned, which is the U.S. National Phase of International Application PCT/GB91/00293, filed on Feb. 25th, 1991.

BACKGROUND OF THE FIELD

1. Field of the Invention

The present invention relates to a touch probe which carries a surface contacting stylus, and is used on a coordinate positioning machine to sense the position of, for example, a workpiece surface. More particularly, the invention relates to a touch probe on which a number of different styli may be interchangeably supported.

One type of known touch probe is a "touch-trigger" probe. Touch-trigger probes emit a trigger signal upon sensing contact between a stylus carried by the probe and a surface. Typically, such a probe comprises a fixed structure, such as a housing, by which the probe may be supported on the movable arm of a coordinate positioning machine (such as a coordinate measuring machine or machine tool), and a stylus-supporting member. The stylus-supporting member is supported within the housing in a rest position from which it may be displaced when a deflecting force is applied to the stylus as a result of contact between the sensing tip of the stylus and the surface of a part to be inspected (this is known as "overtravel"). A biasing force is provided to bias the supporting member into the rest position, so that irrespective of the orientation of the probe, upon removal of the deflecting force the supporting member returns precisely to the rest position. Such a probe is known from U.S. Pat. No. 4,153,998.

Another type of known probe is a "measuring" or "scanning" probe, which has a stylus carrying member suspended by a mechanism providing controlled deflections of the carrying member in 3-dimensions relative to the fixed structure of the probe. Transducers in the probe measure the magnitude and direction of these deflections relative to a reference point on the fixed structure (which is in turn fixedly connected to the movable arm of the machine). As a crash protection feature the stylus is retained on the carrying member by a biasing force, which biases the stylus into a repeatable rest position relative to the carrying member. The stylus may thus be displaced (in opposition to the biasing force) from its rest position on the carrying member in the event of a deflection of the stylus larger than that permitted by the suspension mechanism, thereby avoiding damage to the stylus. Such probes are known from WO89/05435.

It is frequently necessary to inspect parts of a relatively complex shape, having surfaces which are oriented in a variety of directions. One way to perform such inspection is to provide a probe with a suitably shaped stylus, which has one or more sensing tips oriented in such a way that the surface of the part to be inspected may easily be contacted. In order to provide a truly flexible measuring system however, it is necessary to provide automatic changing of one or more such styli on a probe.

2. Description of Related Art

Such an automatic stylus-changing system is known from, for example, U.S. Pat. No. 4,637,119, in which a magnetic clamping device is provided on the stylus-supporting member to enable releasable clamping of a plurality of different styli to the stylus-supporting member.

A problem with touch probes having stylus-changing systems is that different lengths of styli ideally require different biasing forces (a) due to the different weights of their differing lengths and (b) to prevent overloading of short styli. Manual adjustment of the biasing force each time a stylus is changed is impractical since such a stylus changing system is ideally automated to provide flexible part inspection. Automatic adjustment mechanisms for the biasing force (such as the one shown in U.S. Pat. No. 5,024,003) are complex and undesirably add to the weight of the probe.

SUMMARY OF THE INVENTION

A first aspect of the present invention provides a touch probe for use on a coordinate positioning machine, the probe comprising:

a stylus module having a support structure, and a stylus-supporting member for supporting a stylus, the stylus-supporting member being biased into a rest position with respect to the support structure, from which position the supporting member is displaceable relative to the support structure when a deflecting force acts on the stylus, and to which position it may return when said deflecting force is removed;

a sensing module for supporting the stylus module, the sensing module being securable to a movable arm of the machine;

means, acting on the support structure of said stylus module, for releasably retaining said stylus module on said sensing module;

wherein said sensing module comprises means for detecting contact between the stylus and a surface.

By employing the modular approach of the present invention, each stylus module may have a suitably chosen biasing force for biasing the stylus-supporting member into its rest position, and thus when one stylus module is exchanged for another, the biasing force on the stylus-supporting member of each stylus module is appropriate for the length and configuration of stylus of that module. Furthermore, by providing stylus-surface contact detecting means within the sensing module, the need to provide sensors for determining stylus-workpiece contact (either of the strain sensing type, see e.g. U.S. Pat. No. 4,813,151 or U.S. Pat. No. 4,177,568, or of the type which sense displacement of the stylus-supporting member, see e.g. U.S. Pat. No. 4,153,998) in the stylus module, is obviated; the need for any signal communication links between modules is thus also obviated. The stylus module thus serves purely as an overtravel device substantially simplifying the construction.

The sensing module preferably detects contact by sensing a small-scale deformation of the stylus which occurs prior to any displacement of the stylus-supporting member relative to the support structure. In one embodiment such a deformation is sensed by sensing strain (resulting from deformation of the stylus) transmitted through the support structure of the stylus module to a strain-sensitive load cell within the sensing module. The strain-sensitive load cell is preferably relatively stiff to avoid mechanical hysteresis, and to give the correct dynamic range of response to strain without significant deflection of the load cell. In one example, the load cell comprises two structures, one of which is connected directly to the fixed structure of the sensing module, the other of which supports the stylus module, the two structures being interconnected by one or more areas of relative weakness on each of which one or more strain-sensitive elements are provided.

The concept of a modular approach to a stylus changing system finds utility both in conjunction with a touch-trigger probe and a measuring probe.

Accordingly, a second aspect of the present invention provides a touch probe for use on a coordinate measuring machine comprising:

a stylus module having a support structure, and a stylus-supporting member for supporting a stylus, the stylus-supporting member being biased into a rest position with respect to the support structure, from which position the supporting member is displaceable relative to the support structure when a deflecting force acts on the stylus, and to which position it may return when said deflecting force is removed;

a sensing module for supporting the stylus module, the sensing module being securable to a movable arm of the machine;

means, acting on the support structure of said stylus module, for releasably retaining the stylus module on the sensing module;

said sensing module comprising means for detecting displacement of the stylus module relative to the movable arm.

According to this aspect of the invention, the touch probe may be a measuring probe wherein the sensing module includes a fixed structure by which the probe may be connected to the movable arm of the machine, a suspension mechanism providing movement of said stylus module relative to the fixed structure, and one or more transducers for measuring the magnitude of said movement.

Preferably in each aspect of the present invention, the stylus module will be magnetically retained on the sensing module, thus providing amongst other things, additional crash protection for the probe. The joint between the sensing module and the stylus module will preferably be kinematic.

Embodiments of the invention will now be described, by way of example, and with reference to the accompanying drawings in which.

Figure 1:
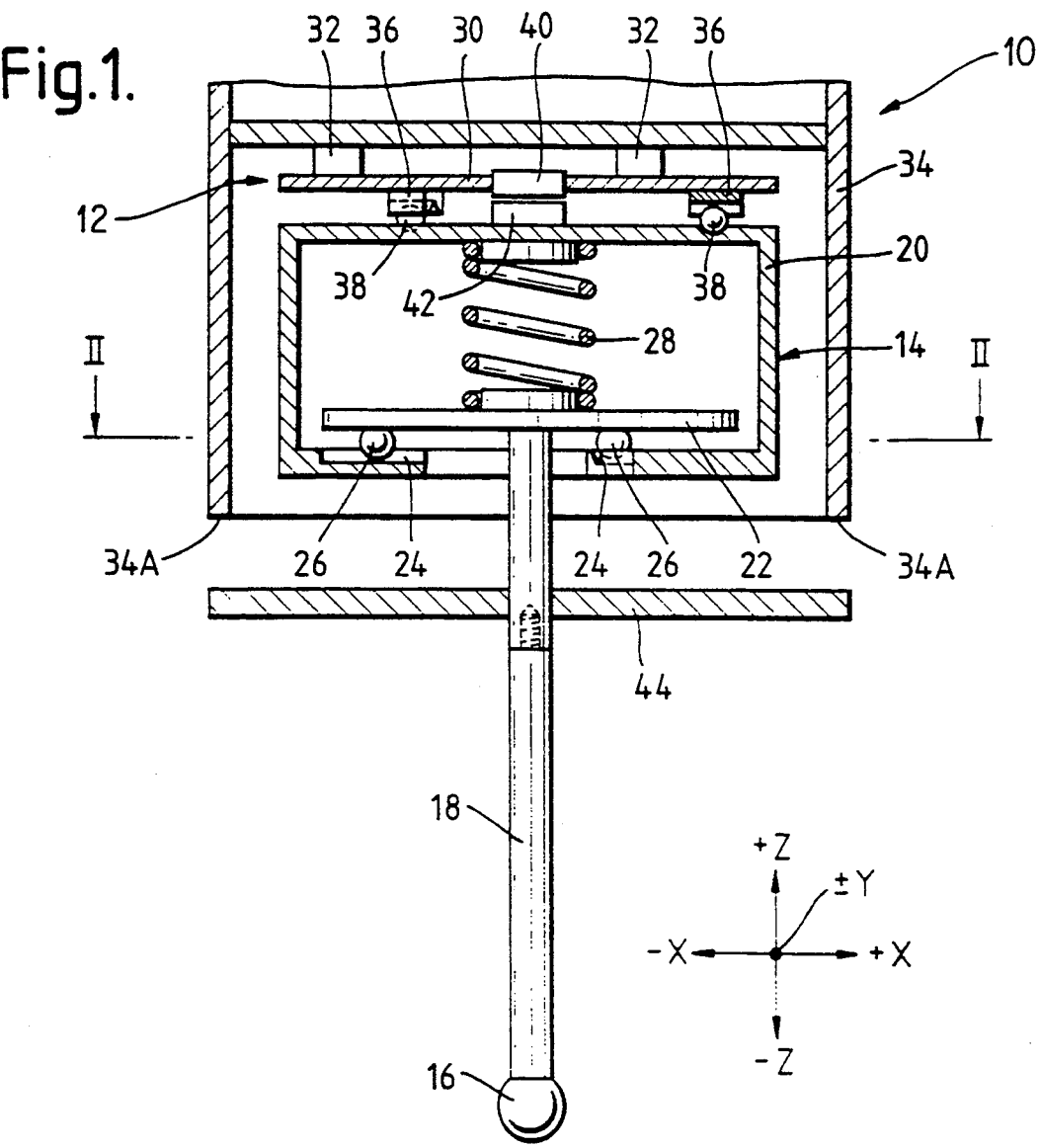
FIG. 1 is a vertical cross-section through a first embodiment of probe according to the present invention.

Referring firstly to FIG. 1, a probe 10 can be attached to the movable arm of a coordinate positioning machine such as a coordinate measuring machine or machine tool, which can then move the probe relative to a workpiece to be measured. The probe 10 comprises a sensing module 12, and a stylus module 14; the stylus module 14 provides for the necessary overtravel when the stylus 18 is deflected by such contact in any horizontal direction, $\pm X$, $\pm Y$, and in the vertical direction $+Z$.

The stylus module 14 comprises a support structure 20, within which the stylus supporting member 22 is located in a rest position on a kinematic mount. A kinematic mount provides a very precisely defined rest position, as is well known. Various forms of kinematic mount are known in the art, and may be used. For example, some forms are described in U.S. Pat. No. 4,153,998 and in "Bauelemente der Physikalischen Technik" by Pollermann, Chapter 4. In general a kinematic mount between two bodies is formed by engagement of two sets of elements, one set on each body. It is generally possible, given one set of engagement elements suitable for forming a kinematic support, to determine the form of a corresponding set of elements required to provide a kinematic mount when the two sets of elements come into engagement.

Figure 2:
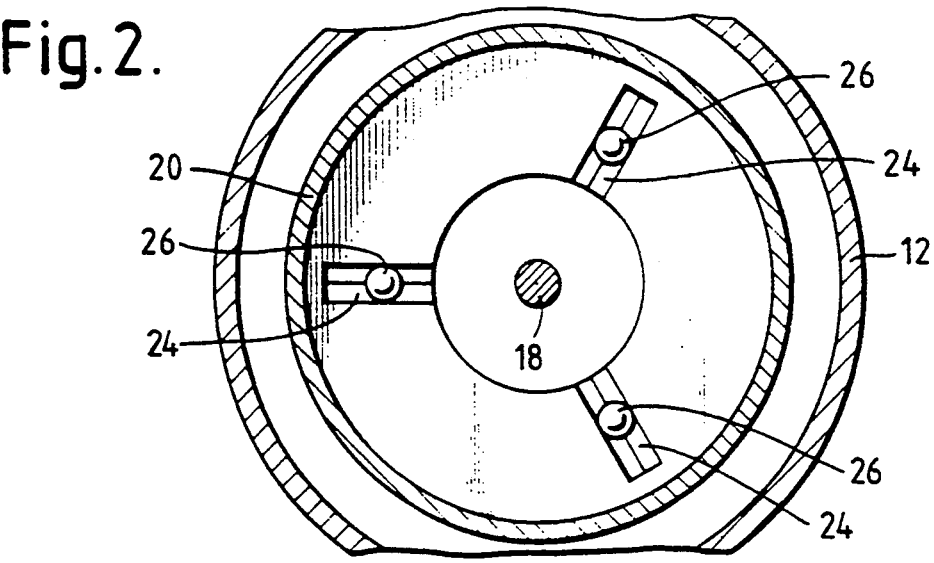
FIG. 2 is a horizontal cross-section on the line II—II in FIG. 1.

In the present embodiment, as seen in FIGS. 1 and 2, the kinematic mount comprises a first set of engagement elements provided by three radially-extending V-grooves 24 in the support structure 20 of the stylus module 14. These grooves are open in the upwards direction, and are spaced at 120° apart from each other around the vertical axis of the probe. The underside of the stylus-supporting member 22 has a second set of engagement elements provided by three corresponding balls 26 affixed thereto. The balls 26 are biased into their respective V-grooves 24 by a compression spring 28 acting between the stylus-supporting member 22 and the support structure 20. The biasing force exerted by the compression spring 28 is chosen with regard to the length and/or configuration of the stylus.

In normal use of the probe, when the stylus tip 16 contacts the workpiece in any horizontal direction, the stylus 18 and the stylus-supporting member 22 tilt about at least one of the balls 26, and one or two of the other balls disengage from their respective V-grooves 24. This provides for the necessary overtravel of the probe without causing damage in normal circumstances. Likewise, the stylus 18 and the stylus-supporting member 22 can be deflected bodily upwards (in the $+Z$ direction) when the probe is brought vertically downwards onto a workpiece. In this case, all the balls 26 disengage from their respective V-grooves 24. When the probe is again moved so that the stylus no longer contacts the workpiece, the stylus-supporting member 22 is returned to its original precisely defined rest position relative to the support structure 20 under the action of the bias provided by the spring 28.

The stylus module 14 is retained on a load cell, here provided by a plate, board or wafer 30 within the sensing module 12, which contains appropriately sensitive sensors and which may also if desired carry electronic circuits associated with the sensors, e.g. to develop a trigger signal each time the sensing tip 16 of the stylus 18 contacts a workpiece. Suitably, the sensors are sensitive to minute strains or deformations. Such strains typically result from deformation of the stylus 18 which occurs upon contact of the stylus with a workpiece, and prior to any displacement of the stylus-supporting member 22 from its rest position. These strains are transmitted through the support structure 20 of the stylus module 14 and to the plate or board 30 whenever such contact occurs; the trigger signal is generated whenever the outputs of such strain sensors exceed a predetermined trigger threshold. The sensors may for example be strain gauges mounted on the plate 30, or on pillars 32 by which the plate 30 is mounted to the fixed structure of the sensing module (provided by the housing 34) as described in U.S. Pat. No. 4,813,151. Alternatively, the board or wafer 30 may be a hybrid integrated circuit, including semiconductor strain gauge elements and the associated electronic circuits. Such a hybrid integrated circuit may be fabricated using thick film technology.

The mounting between the stylus module 14 and the plate, board or wafer 30 takes the form of a further kinematic mount. Again, any of the well known forms of kinematic mount may be used, but in the example shown here three radially-extending V-grooves 36 are provided on the underside of the board 30, spaced at 120° intervals around the axis of the probe. Balls 38 are fixed to the upper side of the stylus module support structure 20 and are located in respective ones of the V-grooves 36. This ensures that the stylus module 14 has a precisely defined rest position relative to the sensing module 12, and together with the kinematic mount of the stylus-supporting member 22 relative to the stylus module 14, the precisely defined rest position of the stylus 18 relative to the sensing module 12, and thus the movable arm of the machine is assured. This obviates the need to re-datum the probe each time one stylus module is exchanged for another. The balls 38 are biased into the V-grooves 36 by means of a permanent magnet 40 provided on the plate 30, which attracts a soft iron striker plate 42 on the upper surface of the stylus module 14 thereby retaining the stylus module 14 on the sensing module 12, while enabling easy interchange of one stylus module 14 for another. However, it will be appreciated that other releasable retaining means may be provided, e.g. such as those disclosed in cases WO85/02138 or U.S. Pat. No. 4,349,946.

The stylus-supporting member 22 is provided with a horizontally extending flange 44. When the stylus 18 is in its rest position, this flange 44 is located under a bottom annular edge 34A of the housing 34, spaced apart from the edge 34A by a gap. This gap is of sufficient size so that the flange 44 does not interfere with the normal operation of the probe described above. However, the flange 44 is useful should a collision accidentally arise in which the movement of the movable arm of the machine is not braked when the stylus 18 hits a workpiece as the probe travels towards that workpiece, e.g. because of faulty programming of a computer which controls the movement of the machine. In such a collision, the flange 44 acts to protect the fragile plate, board or wafer 30 and the sensitive components located on it.

Where such a collision occurs while the probe is travelling horizontally, at first the stylus-supporting member 22 tilts as described above. During this normal tilting, the spring 28 gives way and limits the loading on the plate 30. When the tilting becomes excessive, the flange 44 touches the bottom edge 34A of the housing 34 at one point, and loading then occurs directly between the flange 44 and the housing 34. As the probe overtravels further, the entire stylus module 14 starts to tilt about one or two of the balls 38, and the other ball or balls 38 disengage from their respective V-grooves 36. As such excessive tilting continues, the striker plate 42 moves away from the magnet 40, so that the magnet 40 is no longer able to hold the stylus module 14 in place. The stylus module 14 and the attached stylus 18 then simply fall out of the housing 34, and damage to the fragile (and expensive) board or plate 30 is avoided.

If the collision with the workpiece occurs vertically, in the +Z direction, then as described above the stylus-supporting member 20 lifts bodily within the stylus module 14. Again, the stress on the board or plate 30 is limited by the spring 28. When the overtravel becomes excessive, the flange 44 again contacts the bottom edge 34A of the housing 34. In this case, tilting of the stylus module 14 is not possible but nevertheless all the loading is taken between the flange 44 and the housing 34, and excessive loading of the plate 30 is avoided. Inevitably, the stylus 18 will be damaged, but this is a cheap, and easily replaceable item when compared with the board 30.

Figure 3A:
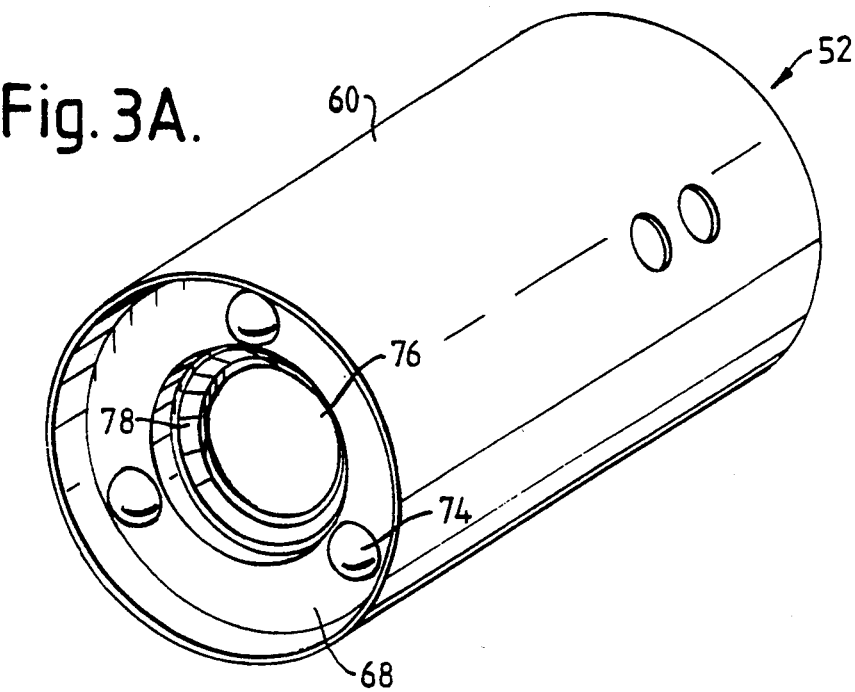
FIGS. 3A and 3B show perspective views of a sensing module and stylus module according to a second embodiment of the present invention.
Figure 3B:
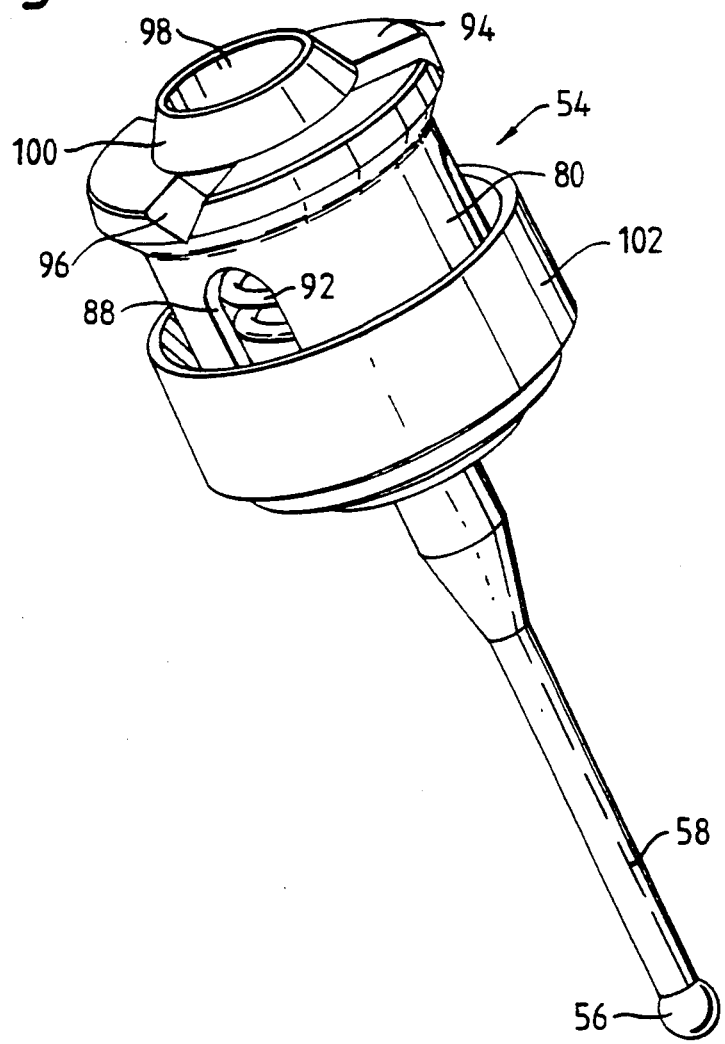
Figure 4:
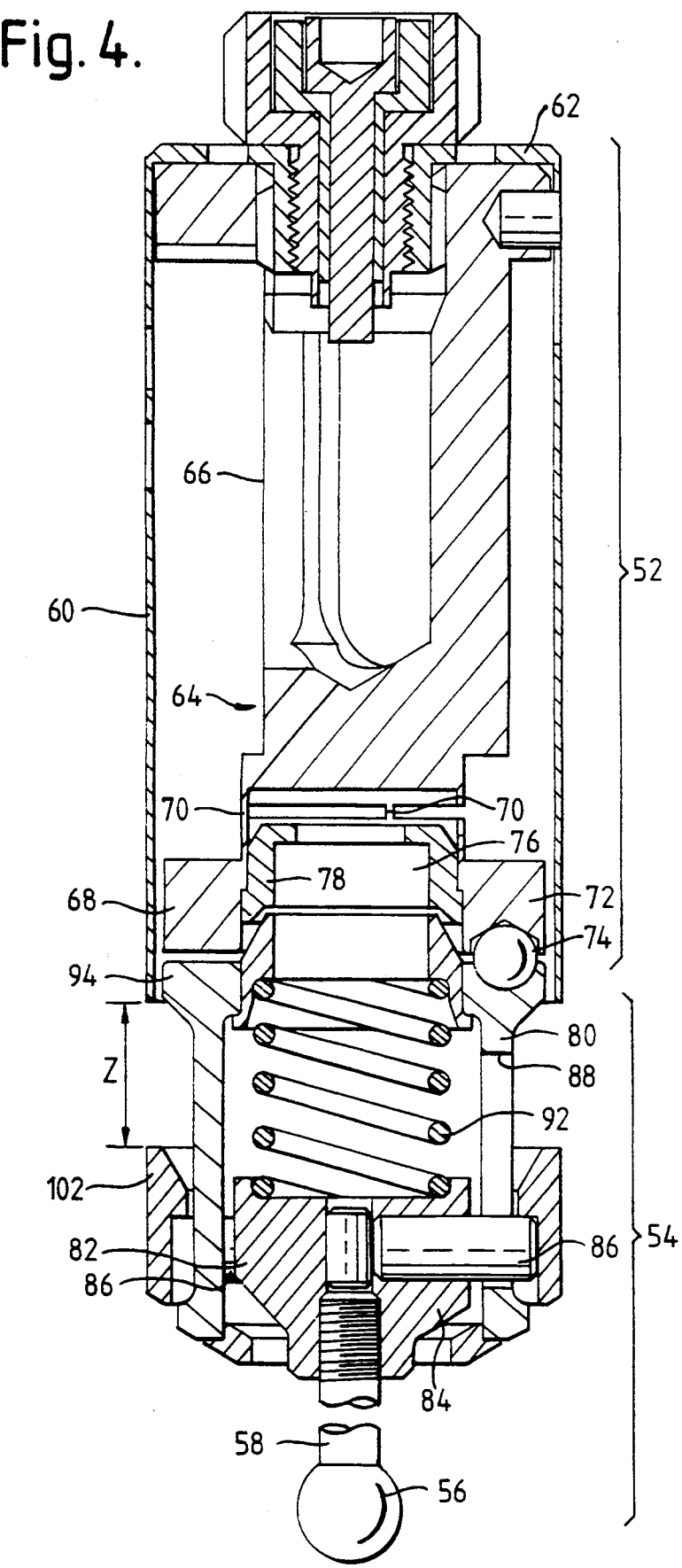
FIG. 4 shows a vertical cross-section through the sensing module and stylus module of FIGS. 3A and 3B.
Figure 5:
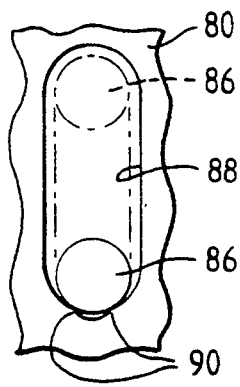
FIG. 5 shows a detail of FIGS. 3B and FIG. 4.

Referring now to FIGS. 3 to 5, a second embodiment of the probe comprises a sensing module 52 on which a stylus module 54 is magnetically and releasably retained. The sensing module 52 determines contact between the sensing tip 56 of a stylus 58 and a surface, and the stylus module 54 provides overtravel of the stylus 58 relative to the sensing module to prevent collision damage.

The sensing module 52 comprises a fixed structure provided by a cylindrical housing 60 having an end wall 62 by which the probe may be connected to the movable arm of a coordinate positioning machine. A load cell 64 is supported on the end wall 62 and comprises two portions: a cage 66 of triangular cross-section which is used to support processing electronics for the sensing module and an annular retaining ring 68 upon which the stylus module 54 is supported. The cage 66 and retaining ring 68 are interconnected by an area of relative weakness provided by three pillars 70. A semiconductor strain gauge (not shown) is supported on each of the pillars 70 to sense strain in the pillar 70 transmitted through the stylus module 54 as a result of contact between the sensing tip 56 of the stylus 58 and the surface of a part to be inspected. The pillars should be sufficiently stiff to avoid hysteresis, and sufficiently yieldable to allow detectable strain to occur in them. When the strain in the strain gauge exceeds a predetermined threshold the signal processing electronics of the sensing module 52 emit a trigger signal which is sent to the machine control in the usual manner. The strain gauges and processing electronics are described more fully in U.S. Pat. Nos. 4,813,151 and 4,817,362 and will not be described further here.

The annular retaining ring 68 comprises an outer ring 72 which carries three equi-spaced balls 74, and a magnet 76 retained inside the outer ring 72 by an inner ring 78.

The stylus module 54 comprises support structure provided by a substantially cylindrical casing 80 whose axis is co-axial with the axis of the stylus 58, and which supports a stylus-supporting member 82 in a kinematic rest position. The stylus-supporting member 82 comprises a central body 84 carrying three rollers 86 which extend radially with respect to the cylindrical casing 80. Each of the rollers 86 projects through a longitudinally extending slot 88 provided in the wall of the casing 80 and rests against a pair of shoulders 90 provided at the base of each of the slots 88 (see FIG. 5). The stylus-supporting member 82 is biased into the kinematic rest position (in which each of the rollers 86 rests against a pair of shoulders 90) by a spring 92, and the force on the stylus-supporting member 82 is chosen to be commensurate with the restoring force required to return the supporting member to its kinematic rest position having regard to the length and configuration of the stylus 58.

The casing 80 terminates at its upper end in a circular flange 94 having three radially extending v-grooves 96 provided in its upper surface. A magnet 98 supported by a collar 100 co-operates with the magnet 76 provided on the sensing module 52 to retain the stylus module 54 thereon. The stylus module 54 is kinematically retained on the sensing module 52 by seating of each of the balls 74 in the convergent surfaces provided by a v-groove 96. The kinematic support between the stylus module 54 and the sensing module 52 ensures high positional repeatability for the sensing tip 56 of the stylus 58 of a given stylus module 54 relative to the sensing module 52 (and therefore relative to the movable arm of the machine on which the probe is supported) over a large number of interchange operations of the particular stylus module 54.

A deflecting force on the sensing tip 56 of the stylus 58 (due to the probe being driven by the machine so that the sensing tip 56 contacts a surface) will initially cause the stylus 58 to deform slightly, prior to any movement of the stylus-supporting member 82 from the rest position. This deformation (or strain) in the stylus 58 is transmitted through the casing 80 of the stylus module to the strain-sensitive load cell, causing strain in the pillars 70 and the associates strain gauges, which in turn causes the associated electronic circuitry to emit a trigger signal (indicating stylus-workpiece contact) at a predetermined level of strain. As the deflecting force increases due to the movable arm of the machine "over-travelling" the point of contact between the stylus 54 and the surface, the stylus-supporting member 82 will be displaced from its rest position against the action of spring 92. One or more of the rollers 86 will thus lift off the shoulders 90 and move upwards in the slots 88.

It is not essential for the strain-sensitive load cell to include strain gauges. Other strain sensitive sensors, such as capacitive sensors (e.g. piezoelectric elements), or optical strain sensitive elements such as bi-refringent elements may be used. In these alternative arrangements the area of weakness which, for example, interconnects the two parts of the load cell, should have a stiffness chosen in accordance with the sensitivity of the sensitive elements employed. Where the elements are sufficiently stiff (e.g. piezoelectric elements) the area of weakness may be provided by the elements themselves.

Potential damage to the pillars 70 (and strain gauges supported thereon) due to excessive upward deflection of supporting member 82 is avoided by providing a skirt 102 supported on the end of the rollers 86, which extends around the casing 80. Upward movement of the stylus 58 (and thus the supporting member 82 and skirt 102) by an amount greater than the distance Z indicated in FIG. 4, will result in the skirt 102 coming into contact with the housing 60. While this is obviously undesirable, it represents an important safety feature in that excessive upward movement of the stylus 58 will not damage the delicate sensors of the sensing module 52; excessive movement of the stylus 58 in either of the two directions (X or Y) perpendicular to the Z direction will simply result in the stylus module 54 becoming disconnected from the sensing module 52 because the magnetic force between the magnets 76 and 98 has been exceeded by the lateral force on the stylus 58.

Figure 6:
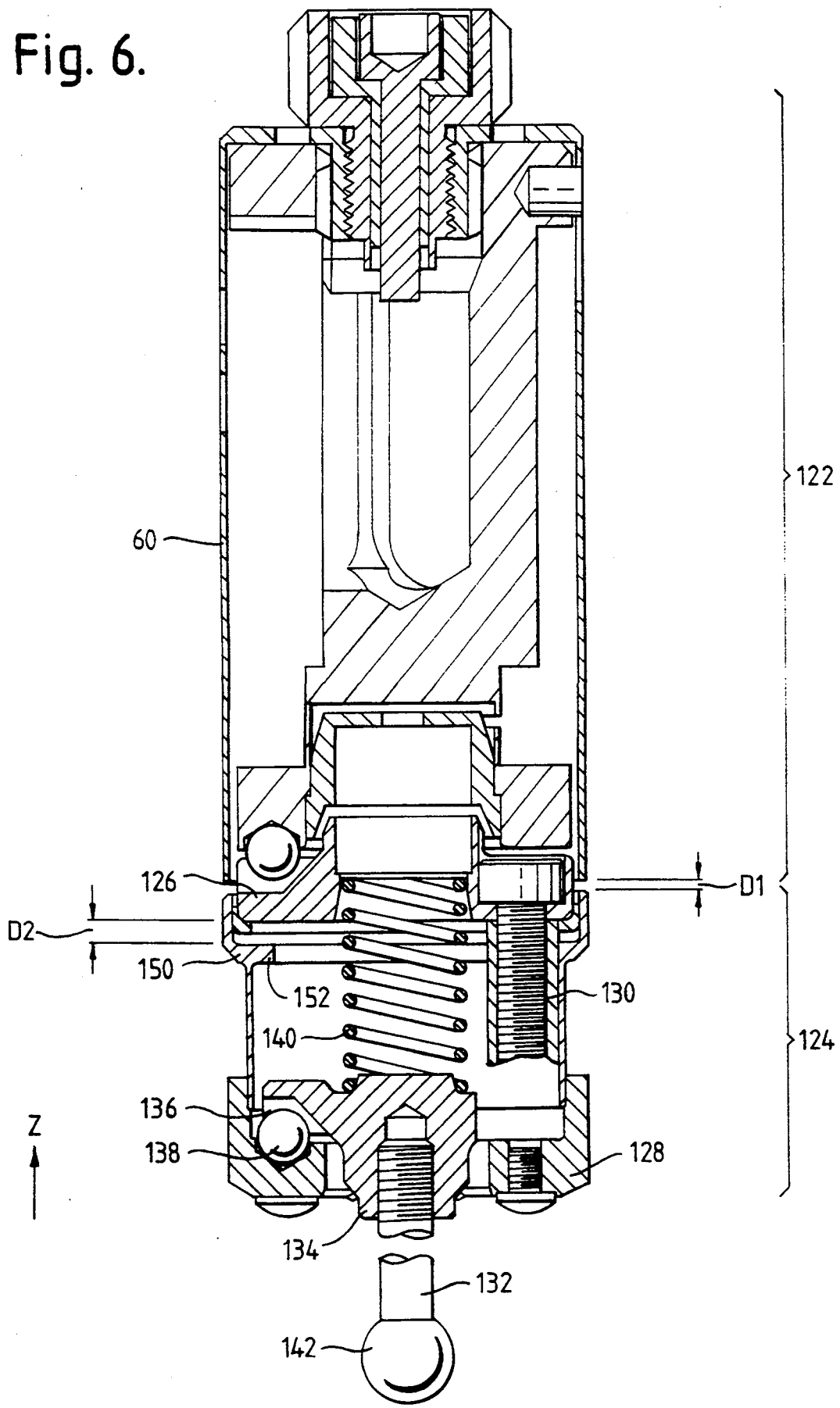
FIG. 6 shows a vertical cross-section through a third embodiment of probe according to the present invention.

A third embodiment of the probe according to the present invention provides an alternative form of stylus module for use with the sensing module 52 of FIGS. 3A and 4. Referring now to FIG. 6, a probe comprises a sensing module 122 and a stylus module 124. The sensing module 122 is identical to the sensing module of FIGS. 3A and 4 and will not be described further.

The stylus module 124 has a supporting structure provided by an upper casing 126 and a lower casing 128; the upper 126 and lower 128 casings being interconnected by three bolts 130, which extend axially with respect to the stylus 132 of the sensing module 124. A stylus-supporting member 134, having three rollers 136 which extend radially with respect to the stylus 132, is kinematically supported on the lower casing 128 by seating of each of the rollers 136 in the convergent surfaces defined by an adjacently positioned pair of balls 138 supported in the lower casing 128. A spring 140, acting between the upper and lower casings 126, 128 of the stylus module 124 urges the stylus-supporting member 134 into its kinematically defined rest position. As described with reference to FIGS. 1 to 4 above, contact between the sensing tip 142 of the stylus 132 and a surface whose position is to be measured results initially in a deformation of the stylus 132 which is sensed by the sensing module, and subsequently in a deflection of the stylus-supporting member 134 from its kinematic rest position.

A floating annular skirt 150 is provided between the upper 126 and lower 128 casings of the stylus module 124. The distal end of the skirt 150 with respect to the housing 60 of the sensing module is received inside the lower casing 128, and has a smaller diameter than the casing 128. The proximal end of the skirt 150 has a diameter corresponding to that of the housing 60, and confronts the housing 60. An inwardly depending annular flange 152 provides an abutment for the stylus-supporting member 134 when deflection of the supporting member 134, in a direction indicated in the Figure as the Z direction, exceeds a predetermined threshold. The dimensions of the skirt 150 are chosen such that the distance D1 between the proximal end of the skirt and the housing 60 is smaller than the distance D2 between the flange 152 and the upper casing 126 of the stylus module 124. Thus, if the stylus-supporting member 134 is excessively displaced in the Z direction the member 134 will first abut the flange 152, whereupon both the supporting member 134 and the skirt 150 will move together. However, because the distance D1 is smaller than the distance D2, the supporting member 134 and skirt 150 will come into contact with the housing 60 before any force is exerted on the upper casing 126 of the STYLUS module 124 (and thus the load cell 64 of the sensing module 122). This arrangement protects the sensitive pillars 70 and semi-conductor strain gauges provided thereon. Because the skirt 150 is displaceable through only a limited range of movement, and only in a single direction, the skirt 150 provides a good degree of sealing of the stylus module 124 from the ingress of dust or other contaminants which may prevent accurate re-seating of the stylus-supporting member 134 in the kinematic rest position.

A fourth embodiment of probe will now be described with reference to FIG. 7 which shows an analogue (or measurement or scanning) probe. As previously described, this probe comprises a fixed structure provided by housing 200 attachable to a coordinate positioning machine. Within the housing 200 a sensing module is provided, which comprises a suspension mechanism 202 for a carrying plate 204, and a transducer arrangement (not shown) for detecting movement of the carrying plate 204 relative to the housing. The suspension mechanism 202 includes three pairs 206A, B, C of parallel leaf springs forming three respective series-connected spring parallelograms. One pair of leaf springs 206A is connected at one end to the housing, and permits translation of the carrying plate 204 in the ±X directions. Connected to the spring parallelograms 206A is the second pair of leaf springs 206B (only one of which can be seen in FIG. 7), which provides for translational movement of the carrying plate 204 in the ±Y directions. Finally, connected between the spring parallelogram 206B and the carrying plate 204 is the third pair of leaf springs 206C, which provides for movement of the carrying plate 204 in the ±Z directions. The carrying plate 204 supports a stylus module 210 (having a stylus 211) as will be described below. The transducer arrangement (not shown) mentioned above preferably comprises a transducer for each of the three axes of movement X, Y, Z, which gives an instantaneous analogue or digital readout of the position of the stylus carrying plate 204 relative to the housing 200 (and thus the movable arm of the machine to which the probe is connected). Other suspension and transducer arrangements which can be used in place of the system 202 are well known, and examples are shown in, for example, U.S. Pat. No. 4,084,323 and in International Patent Specification No. WO90/04149.

Figure 7:
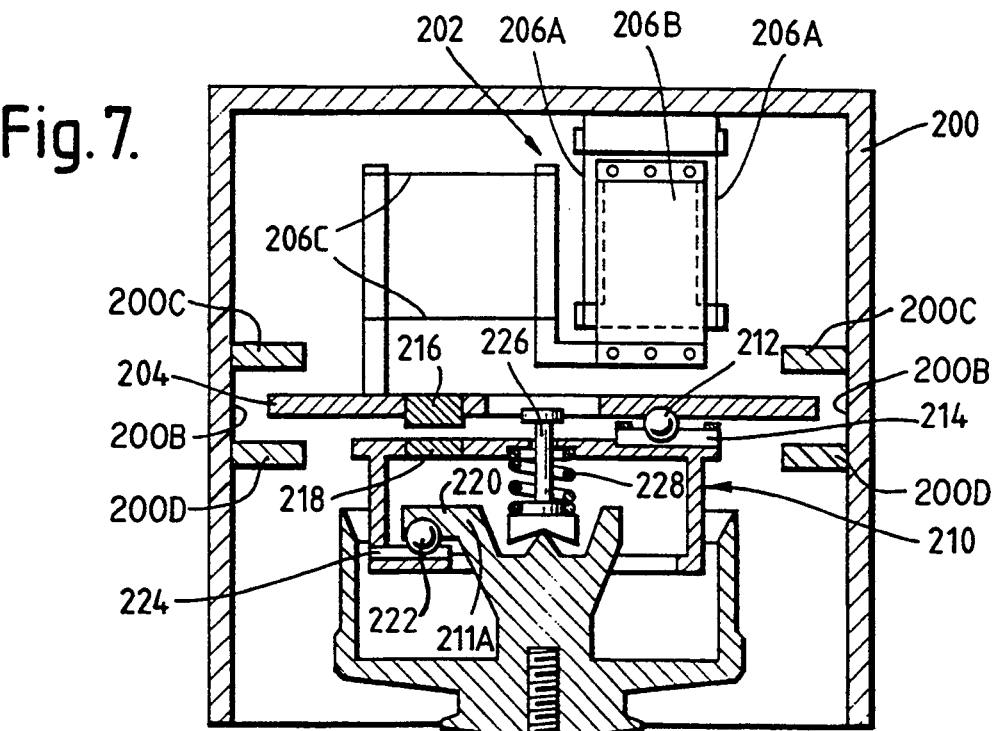
FIG. 7 shows a vertical cross-section through a fourth embodiment of probe according to the present invention.
Figure 8:
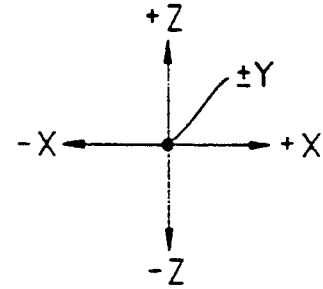
FIG. 8 is a perspective view of a detail of FIG. 7.
Figure 8:
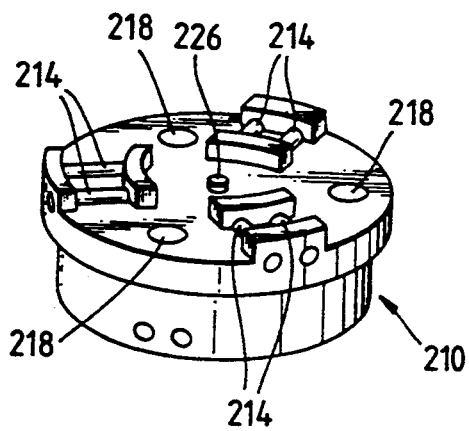

The underside of the plate 204 is provided with three balls 212, spaced apart at 120° intervals around the axis of the probe, only one of which can be seen in FIG. 7. A stylus module 210, (also shown in FIG. 8) has three pairs of rollers 214, the rollers of each pair lying side by side and extending radially, and the pairs being spaced apart by 120° around the axis of the probe so as to correspond with the locations of the balls 212. The balls 212 and rollers 214 thus form a kinematic mount for the stylus module 210, locating it in a precise rest position on the carrying plate 204 so that the measurements made by the transducers in the suspension system 202 are an accurate measure of the position of the stylus module 210. The balls 212 are urged into the rollers 214 by three permanent magnets 216 in the base plate 204, which attract three corresponding soft iron striker plates 218 in the upper surface of the module 210.

Within the stylus module 210 there is a bayonet-type stylus changer which is described in detail in International Patent Specification No. WO 89/05210. This enables not only exchange of one stylus module retained on the carrying plate 204 for another, (the usual mode of operation) but also exchange of styli within the module 210). Briefly, the stylus 211 is supported on a stylus-supporting member 211A having three radial arms 220 (only one of which can be seen in FIG. 7), each arm carrying a ball 222. Each ball 222 is urged into a radial V-groove formed between a pair of cylinders 224 within the module 210, by the action of a captive plunger 226 biased by a compression spring 228. The stylus can be removed and replaced as described in WO89/05210, by lifting it up and rotating it within the module 210.

In ordinary use of the probe of FIG. 7, the kinematic mounts of the stylus 211 in the module 210 and the module 210 on the carrying place 204 remain engaged. Contact between the stylus 211 and a workpiece causes translational movements in the six directions ±X, ±Y, ±Z of the carrying plate 204. These translational movements are accommodated and measured by the suspension system 202.

However, the leaf springs in the suspension system 206 are deliberately made with a low spring rate so that the gauging forces between the stylus and the workpiece are low. As a result, these leaf springs are rather fragile, and it is desired to protect them. This is achieved by providing stops or abutments to limit the permissible movement of the carrying plate 204. In the ±X and ±Y directions, the movement is limited by one or more of the edges of the plate 204 coming into contact with the housing 200 e.g. at locations 200B. To limit the ±Z movements of the carrying plate 204, the housing 200 has inwardly facing lugs or flanges 200C, D above and below the edge of the plate 204. Thus, in the event of excessive overtravel in any direction, the plate 204 comes into contact with one of the locations 200B, C, D and is thus prevented from moving further. The force of any collision is thus taken directly between the plate 204 and the housing 200, and is not transmitted through the fragile suspension system 202, and thus cannot cause damage to the suspension system.

Once the further movement of the plate 204 has been limited in this manner, further deflection of the stylus 211 is permitted (in any horizontal direction) by tilting of the stylus 211, and thus of the stylus-supporting member 211A within the stylus module 210, the stylus-supporting member moving against the biasing action of the spring 228. The biasing force of the spring 228 is chosen with regard to the length and configuration of the stylus 211 and the maximum permitted force of collision between the plate 204 and the housing 200. If the overtravel continues, eventually this tilting action is brought to an end when one of the arms of the stylus-supporting member 211A touches the upper inside surface of the module 210. Further tilting movement of the stylus 211 is now permitted by disengagement between one or more of the balls 212 and its pair of rollers 214, and the module 210 falls away from the plate 204.

If there is excessive stylus deflection in the +Z direction (upwards), after the base plate has hit the lug or flange 200C, then the arms of the supporting member 211A lift vertically straight upwards within the module 204, until they hit the inside upper surface of the module. If overtravel continues further, any damage is restricted to the cheap and easily replaceable stylus 211.

In the event of excessive stylus deflection in the −Z direction (downwards), then after the plate 204 has hit the lug or flange 200D, the balls 212 disengage straight away from the rollers 214, against the attraction of the magnets 216. The entire stylus module 210 with the stylus 211 drops harmlessly out of the housing 200.

The probe embodiments described above may be employed on a machine to provide a flexible measuring system by virtue of the ability to change styli. To this end, a rack containing a plurality of stylus modules, each having a stylus configuration suitable for a particular measuring operation and a biasing force appropriate for the stylus configuration concerned, may be provided on the machine. An example of such a rack is shown in U.S. Pat. No. 4,688,307.

We claim:

1. A touch probe for use on a coordinate positioning machine, the probe comprising:
   a stylus module having a support structure and a stylus-supporting member for supporting a stylus, the stylus-supporting member being biased into a rest position with respect to the support structure, from which position the supporting member is displaceable relative to the support structure when a deflecting force acts on the stylus, and to which position it may return when said deflecting force is removed;

a sensing module for supporting the stylus module, the sensing module being securable to a movable arm of the machine;

means, acting on the support structure of said stylus module, for releasably retaining said stylus module on said sensing module;

wherein said sensing module comprises means for detecting contact between the stylus and a surface.

2. A touch probe according to claim 1 wherein said means for detecting contact includes means for sensing strain, resulting from deformation of the stylus, and transmitted from said stylus to said sensing module via the support structure of the stylus module.

3. A touch probe according to claim 2 wherein said sensing module comprises a fixed structure by which said sensing module may be secured to the movable arm of the machine, and said means for sensing strain includes a load cell, said load cell having a first portion connected to said fixed structure, and a second portion on which, in use, said stylus module is retained, a relatively weak structure interconnecting the first and second portions, and means provided between the first and second portions for detecting strain in said relatively weak structure.

4. A touch probe according to claim 3 wherein said fixed structure is provided by a cylindrical housing defining an axis, and the support structure of the stylus module includes an upper and a lower casing rigidly connected to each other, the stylus module further comprising an intermediate cylindrical skirt, extending from the lower casing to the upper casing; the skirt being axially movable between a first position in which the skirt rests on the lower casing, and a second position; the skirt terminating at its upper end in a rim having a diameter which enables the skirt to abut the housing in said second position; and wherein the skirt includes a catch member engageable by the stylus-supporting member when the stylus-supporting member is displaced axially from said rest position.

5. A touch probe according to claim 4, wherein when the skirt occupies the first position, the axial distance between the catch member and the upper casing is larger than the axial distance between the rim and the housing.

6. A touch probe according to claim 1, wherein said means for releasably retaining said stylus module on said sensing module includes means for magnetically retaining said stylus module on said sensing module.

7. A touch probe according to claim 6 wherein, in use, said stylus module is kinematically supported on said sensing module.

8. A touch probe for use on a coordinate positioning machine comprising:

a stylus module support structure and a stylus-supporting member for supporting a stylus, the stylus-supporting member being biased into a rest position with respect to the support structure, from which position the supporting member is displaceable relative to the support structure when a deflecting force acts on the stylus, and to which position it may return when said deflecting force is removed;

a sensing module for supporting the stylus module, said sensing module including a fixed structure by which said sensing module may be secured to a movable arm of the machine, and a suspension mechanism enabling displacement of the stylus module relative to the fixed structure;

means, acting on the support structure of said stylus module, for releasably retaining the stylus module on the suspension mechanism of said sensing module;

said sensing module comprising means for detecting displacement of the stylus module relative to the movable arm.

9. A touch probe according to claim 8 wherein said means for releasably retaining the stylus module on the suspension mechanism of said sensing module includes means for magnetically retaining said stylus module on said suspension mechanism of the sensing module.

10. A touch probe according to claim 9 wherein said stylus module is kinematically supported on said sensing module.

11. A stylus module for use in conjunction with a sensing module, to which said stylus module is releasably securable, as a touch probe on a coordinate positioning machine, said stylus module comprising:

a support structure having a set of engagement elements suitable for forming a kinematic support with a corresponding set of engagement elements provided on a sensing module;

a stylus supporting member, for supporting a workpiece contacting stylus, the stylus-supporting member being biased into a rest position with respect to the support structure, from which position the supporting member is displaceable relative to the support structure when a deflecting force acts on the stylus, and to which position the supporting member may return when said deflecting force is removed;

wherein no sensors for determining stylus-workpiece contact are provided on said stylus module.

12. A stylus module according to claim 11 further comprising at least one ferromagnetic element provided on said support structure, to enable magnetic retention of said stylus module on a sensing module.

13. A stylus module according to claim 11 wherein the support structure has an axis, and includes an upper casing and a lower casing rigidly connected to each other and axially spaced apart, the stylus module further comprising:

an intermediate cylindrical skirt extending from the lower casing to the upper casing;

the skirt being axially movable between a first position in which the skirt rests on the lower casing, and a second position; and wherein the skirt includes a catch member engageable by the stylus-supporting member when the stylus-supporting member is displaced axially from the rest position.

* * * * *